United States Patent [19]

Johnson

[11] 4,200,373
[45] Apr. 29, 1980

[54] PHOTOGRAPHIC CAMERA APPARATUS FOR VISUALLY INDICATING THE STATUS OF AN EXPOSURE TRIM MECHANISM

[75] Inventor: Bruce K. Johnson, Andover, Mass.

[73] Assignee: Polaroid Corporation, Cambridge, Mass.

[21] Appl. No.: 929,840

[22] Filed: Jul. 31, 1978

[51] Int. Cl.² ............................................. G03B 17/20
[52] U.S. Cl. ...................................... 354/53; 354/198; 354/289
[58] Field of Search ...................... 354/53, 54, 55, 57, 354/59, 198, 289

[56] References Cited

U.S. PATENT DOCUMENTS

| | | |
|---|---|---|
| 2,952,195 | 9/1960 | Babcock et al. |
| 3,128,669 | 4/1964 | Steisslinger |
| 3,150,581 | 9/1964 | Wilharm |
| 3,179,027 | 4/1965 | Swarofsky |
| 3,416,867 | 12/1968 | Biber ..................................... 354/59 |
| 3,570,382 | 3/1971 | Neudecker et al. |
| 3,583,300 | 6/1971 | Johnson et al. |
| 3,792,650 | 2/1974 | Mueller et al. |
| 4,060,817 | 11/1977 | Dionne ..................................... 354/198 |

Primary Examiner—Russell E. Adams
Attorney, Agent, or Firm—Francis J. Caufield

[57] ABSTRACT

A photographic camera of the type having an automatic exposure control system which regulates the exposure delivered to a film of predetermined speed and which includes a manually operable exposure trim mechanism which varies the control of the exposure control system in accordance with the trim mechanism's position is provided with apparatus by which a visual indication of the status of the trim mechanism is provided in the camera's viewfinder.

8 Claims, 4 Drawing Figures

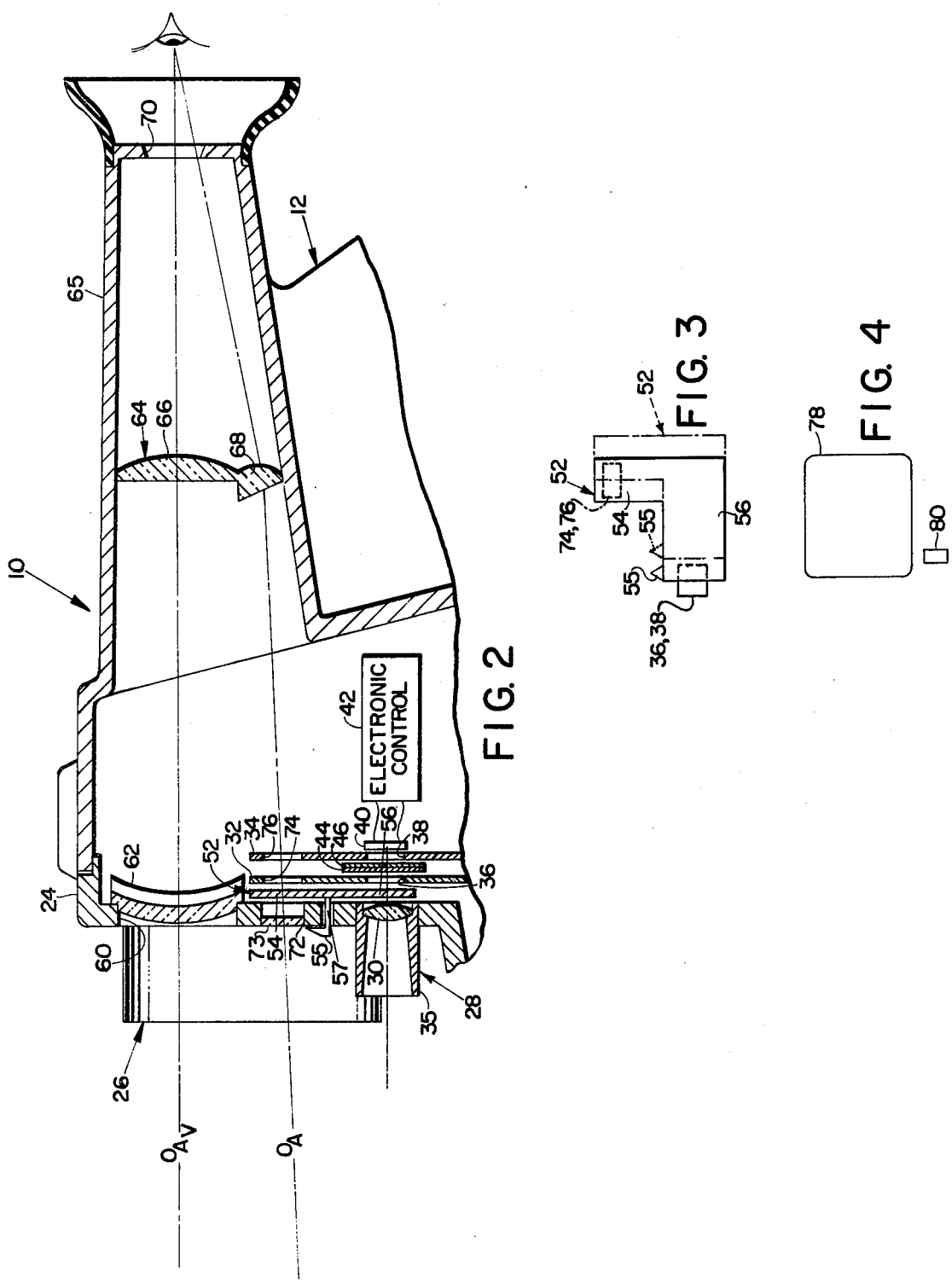

PHOTOGRAPHIC CAMERA APPARATUS FOR VISUALLY INDICATING THE STATUS OF AN EXPOSURE TRIM MECHANISM

BACKGROUND OF THE INVENTION

1. Field of the Invention

This invention in general relates to photography but in particular to photographic camera apparatus by which a camera user is given a visual indication in a camera's viewfinder of the status of a manually operable exposure trim mechanism which is used to vary the control of the camera's automatic exposure system.

2. Description of the Prior Art

Photographic cameras of the type which include systems by which the exposure of a film is automatically controlled in a predetermined manner are well-known in the prior art. In general, such exposure control systems usually consist of an electro-mechanical shutter arrangement which is controlled by the output of a light sensing element in such a way that aperture and/or shutter speed are set in accordance with the film's given ASA speed rating and what the light sensing element judges the "average" scene brightness to be. As examples of such automatic exposure control systems, reference may be had to U.S. Pat. No. 3,975,744 issued to Bruce K. Johnson et. al. on Aug. 17, 1976 and entitled "Automatic Exposure Control System"; U.S. Pat. No. 3,896,458 issued to Bruce K. Johnson et. al. on July 22, 1975 and entitled "Automatic Exposure Control System"; and U.S. Pat. No. 4,035,813 issued to George D. Whiteside on July 12, 1977 and entitled "Exposure Control System For Selectively Determining Exposure Interval".

Although these automatic systems have remarkably good exposure performance for the majority of scene lighting conditions normally encountered in photographic work, certain types of scene lighting situations —particularly those known as "high-contrast"—do exist which require an exposure which is different from the "average" which would normally be predicted by the automatic exposure control system's light sensing element. Therefore, when an anomalous scene lighting situation like a strongly back-lit scene is encountered, the light sensing element will predict an "average" exposure which for back-lit conditions will be less than that necessary to capture the more important details of the scene. The effect of such underexposure, of course, will be that the picture's primary subject will be darker than desired.

Those skilled in the photographic arts have recognized that the automatic type exposure control system has this peculiar exposure control problem in dealing with "high contrast" lighting situations and have solved the problem by providing exposure "trim" arrangements by which a photographer can manually change the response of the light sensing element of the exposure control system and thus its output which in turn causes the film to be exposed either more or less than it would otherwise be if the system were allowed to operate at its "average" or nominal setting. Thus, with these "trim" arrangements the photographer has a degree of discretionary control over what the exposure will be and can exercise it according to his personal preference and judgment regarding how much departure from the "average" setting is required for the particular scene being photographed. For such trim arrangements reference may be had to, for example, U.S. Pat. No. 3,832,721 issued to Irving Erlichman on Aug. 27, 1974 and entitled "Lockout Mechanism For Automatic Trim Assembly Return Mechanism" and U.S. Pat. No. 4,007,468 issued to Igor Blinow et. al. on Feb. 8, 1977 and entitled "Trim Control Apparatus For Photographic Exposure Control System".

While the aforementioned manual exposure "trim" arrangements and others which are functionally similar allow for the exercise of a degree of personal control over exposure to accommodate the anomalous scene lighting condition, a photographer must generally remember to reset them to their nominal position after having made a change for the anomalous scene. Otherwise the "average" scene which accounts for the majority of pictures taken will be misexposed. Therefore, it is the primary object of the present invention to provide photographic camera apparatus for use with cameras having automatic exposure control systems with a means by which a camera user is provided with a visual indication, preferably in the camera's viewfinder, that an exposure trim mechanism is set in one of its positions other than its "average" or nominal one so that the user can adjust the trim mechanism to a position which he prefers.

Other objects of the invention will in part appear hereinafter. The invention accordingly comprises the apparatus possessing the construction, the combination of elements, and arrangement of parts which are exemplified in the following detailed disclosure.

SUMMARY OF THE INVENTION

This invention relates to photographic camera apparatus for use in a camera of the automatic type which is adapted to use film having a given speed and which includes viewfinder means for providing the camera user with a field-of-view that is generally coextensive with the camera's optical-taking system so that the camera can be aimed to frame subject matter to be photographed.

The camera apparatus comprises automatic exposure means for controlling the exposure of a film, and the automatic exposure means includes manually adjustable trim means for selectively varying the control of the automatic exposure means. The trim means is structured to be movable between a nominal position at which the exposure of the film is a predetermined value and other positions at which the exposure of the film differs from the predetermined value by predetermined amounts, greater or less than the predetermined value, which depend on the position of the trim means.

Additionally included are means responsive to the trim means for providing to a user of the camera a visual indication in the camera's viewfinder that the trim means is positioned at one of its positions other than its nominal position so that the user of the camera, while framing the subject matter to be photographed, can at his discretion adjust the trim means for an exposure that will produce a picture which will be either lighter or darker than the one that would be produced if the trim means remained unchanged or place the trim means in its nominal position.

In the preferred embodiment, the camera apparatus of the invention is structured so that the visual indication appears aside of the field-of-view of the camera's viewfinder means.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

FIG. 2 is a cross-sectional view of a portion of the camera of FIG. 1 taken generally along line 2—2 of FIG. 1;

FIG. 3 is a diagrammatic front view illustrating portions of the invention in two different operating positions; and FIG. 4 is a diagrammatic view of what a photographer would see looking through the viewfinder of the camera of FIG. 1 when the portions of the invention illustrated in FIG. 3 are in one of their positions illustrated therein.

DESCRIPTION OF THE PREFERRED EMBODIMENT

Figure 1:
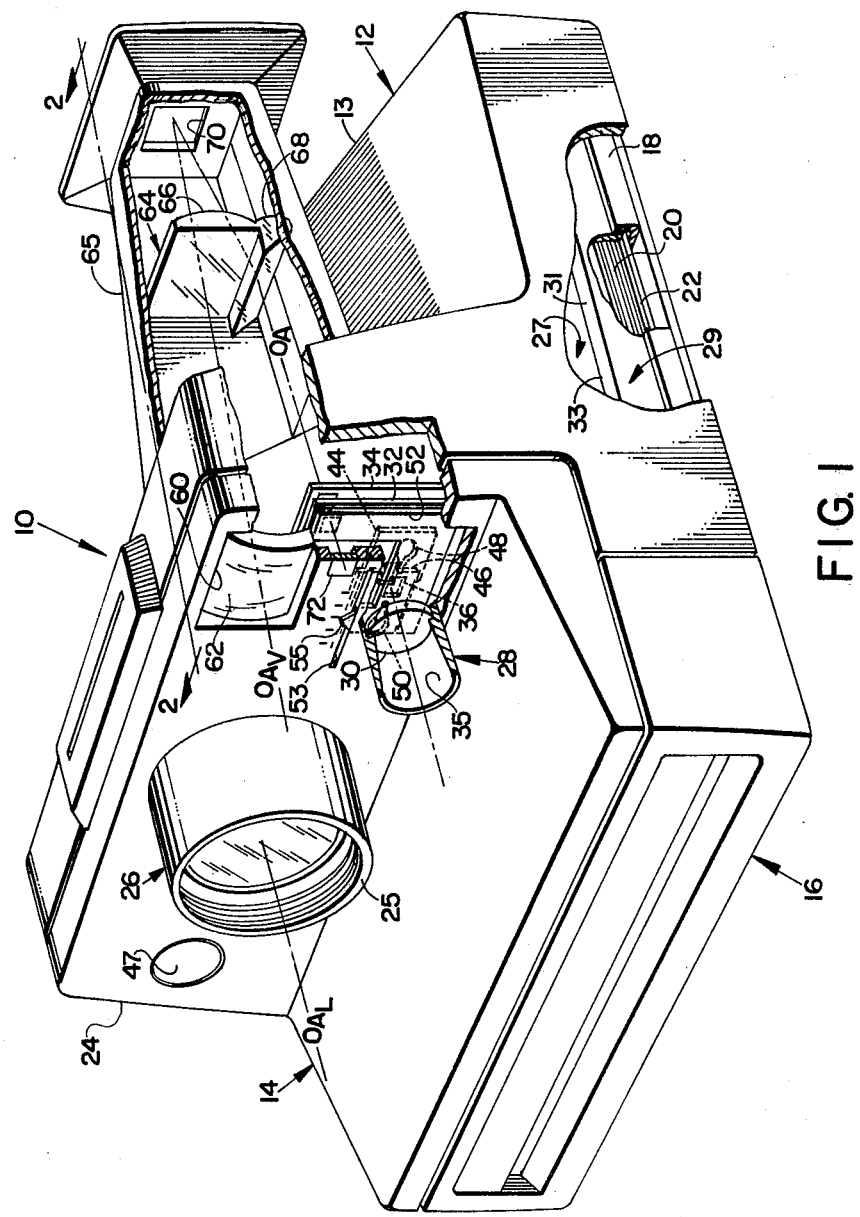
FIG. 1 is a perspective view with parts broken away of a camera embodying the present invention.

Referring now to FIG. 1, there is shown a fully automatic camera 10 of the type which uses integral, self-processable film units and in which the photographic apparatus of the present invention is incorporated.

The camera 10 comprises a body 12, a front cover 14, and a door 16 which interconnect in a well-known manner to define its outward appearance and to serve as a protective enclosure for housing its interior components.

Located in a vertical forward wall 24 of the front cover 14 is an objective taking lens 26 having an optical axis, $OA_L$, therethrough. The objective taking lens 26 may be a Cooke Triplet or similar multi-element type of lens which can have its focal length changed by adjusting the axial air spacing between its optical elements. This may be accomplished in a well-known manner by rotating a bezel, such as that designated at 25, which extends through a central opening in the front cover's vertical wall 24 and is coupled with a screw-threaded lens mount (not shown).

Formed in the base of the body 12 is a well-known film cassette receiving chamber generally designated at 27 which is adapted to releasably hold a film cassette such as that designated at 29. The cassette 29 comprises a generally rectangular parallelepiped housing 18 which has an upwardly facing wall 31 having a generally rectangular aperture 33 therein. Mounted in registration with and biased toward the aperture 33 is a stacked array of integral type self-processable film units generally designated at 20. Each of the film units 20 has a given film speed requiring a predetermined exposure which the camera 10 provides in a manner to be described. Underneath the stacked array of film units 20 is a flat, thin battery 22 which is electrically coupled in a well-known manner to the camera's various electrical systems.

An example of such a film cassette is described in considerable detail in U.S. Pat. No. 3,872,487 issued to Nicholas Gold on Mar. 18, 1975 and entitled "Photographic Film Assemblage and Apparatus" and of such film units in U.S. Pat. Nos. 3,415,644; 3,594,165; and 3,761,268.

The body 12 also includes a generally planar rear wall 13 slanted at a predetermined angle with respect to both the film cassette's upwardly facing wall 31 and the optical axis, $OA_L$, of the objective taking lens 26. Attached to the interior of the rear wall 13, but not shown, is a trapezoidal shaped mirror positioned along the optical axis, $OA_L$, intersecting it at a predetermined angle, to provide a folded optical path between the objective taking lens 26 and an uppermost one of the stacked array of film units, 20. With this optical arrangement, rays from a scene being photographed, which emerge from the objective taking lens 26, are reflected from the mirror toward the film units 20 to expose them. Moreover, it will be recognized by those skilled in the art that with this optical arrangement, the objective taking lens 26 and the peripheral edges of the film cassette's aperture 33 cooperate to define the field of view of the camera 10.

Extending rearwardly from the body 12 is a tubular section 65. Located in the upper right-hand corner of the front cover's vertical wall 24 is an aperture 60 (refer also to FIG. 2) which is generally centrally aligned with the center of the forward end of the tubular section 65 and a negative lens 62 which is optically structured to form a virtual image of a scene to be photographed is mounted in registration with the aperture 60. Within the tubular section 65 and along the optical axis $OA_V$ of the negative lens 62 is mounted a bifocal optical element 64. The optical element 64 consists of an upper positive section 66 and a lower positive section 68 having a forward face formed as a wedge.

Spaced a predetermined distance behind the optical element 64 and also along the negative lens optical axis, $OA_V$, is an eye relief aperture 70. The negative lens 62, the optical element's upper positive lens section 66, and the elongated eye relief aperture 70, thus arranged, define a reversed Galilean telescope which serves as a viewfinder for the camera 10. Those skilled in the art will recognize that the field of view of such a viewfinder can be made to be substantially coextensive with that of the camera 10. The purpose of the optical element's lower positive section 68 will subsequently become apparent from the description to follow.

In the foregoing manner, the camera 10 is adapted for use with film having a given speed and includes viewfinder means for providing a camera user with a field of view that is generally coextensive with that of the camera's optical taking system so that the camera 10 can be aimed to frame the subject matter to be photographed.

Again referring to FIGS. 1 and 2, there can be seen, fixedly stationed behind the front cover's vertical forward wall 24, a shutter baseblock comprising spaced apart front and rear walls, 32 and 34, respectively, both of which are selectively shaped to support various components of the camera's exposure control system as hereinafter described.

Located in each of the baseblock's walls, 32 and 34, are rectangular shaped apertures, 36 and 38, respectively which are aligned with one another. A light sensing element or photodetector 40 is mounted behind the aperture 38 in registration therewith and an optical system 28 which consists of a generally cylindrical hollow member 35 in which is mounted a positive lens 30 is mounted with the front wall 24 forward of the aperture 36. The optical system 28 is structured in a well-known manner to collect radiation in a selective manner from the scene being photographed and to direct the collected radiation onto the surface of the photodetector 40. The photodetector 40 is preferably a silicon photodiode arranged in a reversed biased manner to produce an output signal which varies in correspondence with the intensity of light incident on its surface. The optical system 28 and the photodetector output are calibrated in a well-known manner so that the variation in the photodetector's output signal represents a corresponding variation in scene brightness.

Mounted on the shutter baseblock between its front and rear walls, 32 and 34, is a shutter blade apparatus which comprises part of the camera's automatic exposure control system. The blade apparatus includes two overlapping, elongated opaque blade elements, 44 and 46 (only partially shown), of the so-called "scanning type". The blade elements, 44 and 46, operate in a well-known manner to selectively block and unblock the camera's optical taking path to expose the film units 20 and the optical path from the optical system 28 to the photodetector 40. To accomplish this, the blade elements, 44 and 46, are provided with a pair of scene light admitting apertures 46 and 48 respectively which collectively define a progressive variation of aperture openings in accordance with simultaneous longitudinal and lateral displacement of one of the blade elements with respect to the other in a manner as is fully described in U.S. Pat. No. 3,942,183 issued to George D. Whiteside on Mar. 2, 1976 and entitled "Camera With Pivoting Blades". The apertures 46 and 48 are selectively shaped so as to overlap the baseblock's front and rear wall apertures, 36 and 38, respectively thereby defining gradually varying effective aperture sizes as a function of the position of the blade elements 44 and 46.

Each of the blade elements 44 and 46 are also provided with a second pair of apertures (not shown) which can be aligned with the objective taking lens 26 and are configured to unblock the camera's optical taking path to expose the film units 20. The second apparatus in the blade elements 44 and 46 move in correspondence with the apertures 46 and 48 so that scene light is substantially simultaneously transmitted along the camera's taking path and along the camera's optical path to the photodetector 40. In this manner, the photodetector 40 generates a control signal while the film is being exposed.

The photodetector 40 is electrically coupled with a well-known electronic control circuit shown schematically at 42 in FIG. 2. The control circuit 42 operates to cause the blade elements 44 and 46 to undergo a controlled reciprocating motion in one direction in response to actuating a system start button 47 which extends through an aperture in the front cover 14. During the motion of the blades 44 and 46 in their first direction, the electronic control circuit 42 receives the photodetector's output signal and in response thereto causes the blade elements, 44 and 46, to move in a reciprocating manner in a direction opposite to their initial motion after an appropriate interval which depends on the scene brightness as evaluated by the photodetector 40 and the film speed requirements. During the interval while the camera's optical taking path is unblocked, an uppermost one of the film units 20 is exposed to a predetermined value. For a more detailed explanation of the nature and function of the blade element mechanics and the detailed nature and function of the electronic control circuit 42 reference may be had to aforementioned U.S. Pat. No. 4,035,813.

Also included in the camera's automatic exposure control system is a manually adjustable exposure trim which consists of a trim member 52 located intermediate the front cover's vertical wall 24 and the shutter baseblock's front wall 32 (FIGS. 1, 2 and 3). The trim member 52 comprises a lower variable density portion 56 and an upper opaque portion 54.

The trim member 52 is mounted to the baseblock's front wall 32 in a conventional manner so that its lower variable density portion 56 can be slidably moved in linear fashion back and forth across the front wall's aperture 36. Movement of the trim member 52 is effected by manually pushing or pulling on a pointer 55 which is connected to the trim member 52 via an arm section 57 (FIG. 2). The arm section 57 extends through an elongated slot 53 located in the front cover's vertical wall 24 just above the optical system 28 and below the viewfinder's negative lens 62. The position of the trim member's lower portion 56 with respect to the apertures 36 and 38 is indicated by indicia marks located above the elongated slot 53 on the front cover's vertical wall 24. In this manner the trim member's lower portion 56 can be moved between different positions of scene light intercepting relation with respect to the apertures 36 and 38 and thus also with respect to the photodetector 40.

The optical transmission density of the trim member's lower portion 56 is selected to vary in a predetermined manner such that the amount of scene light that can impinge on the surface of the photodetector 40 is made to vary in a predictable manner in correspondence with the position of the trim element 52 with respect to the apertures 36 and 38. This arrangement allows the camera user to selectively vary the amount of scene light that reaches the photodetector 40 by manually manipulating the pointer 55 and thus changing the strength of the photodetector's output signal at a given scene brightness. Thus the trim element 52 operates as a means for manually varying the amount of exposure which the film will experience since the exposure directly depends on the photodetector's output signal.

When the trim element 52 is positioned as shown in solid in FIG. 3, halfway blocking the apertures 36 and 38, it is in a nominal position in which the exposure delivered to the film is a predetermined value corresponding to average scene lighting conditions. When in its position as illustrated in phantom in FIG. 3, the trim element's lower portion 56 completely uncovers the apertures 36 and 38 thus permitting more scene light to reach the photodetector 40 and thereby reduce the exposure of the film because the magnitude of the photodetector's output signal will be greater under these conditions. When an exposure greater than that at the nominal setting is needed, the trim element 52 is simply moved to the left (FIG. 3) where its lower portion 56 covers a greater portion of the apertures 36 and 38 thereby reducing the magnitude of the photodetector's output signal.

As those skilled in the art will recognize, the optical transmission density of the lower portion 56 can be made to vary by providing a constant density transmissive material whose thickness varies along its direction of travel over the apertures 36 and 38 or the transmission characteristic can be made to vary by providing a constant thickness element with densities that continuously vary in the direction in which the lower portion 56 travels.

In the foregoing manner, the camera 10 is provided with automatic exposure means for controlling the exposure of a film which means include manually adjustable trim means for selectively varying the control of the automatic exposure means. Moreover, the trim means is movable between a nominal position at which the exposure delivered to the film is a predetermined value and other positions at which the exposure of the film differs from the predetermined value by predetermined amounts, greater or less than the predetermined value, which depend on the position of the trim element 52.

The upper opaque portion 54 of the trim element 52 moves in conjunction with its lower transmissive portion 56 because two portions are integrally formed to make up the trim element 52.

The upper opaque portion 54 is configured and arranged so that when the trim element 52 is in its nominal position (shown in solid in FIG. 3), the opaque portion 54 is in scene light blocking relation to a series of two in line apertures 74 and 76 which are formed respectively in the shutter baseblock's front and rear walls 32 and 34 and which can be directly illuminated by scene light from an aperture 72 which is located in the front cover's vertical wall 24 just below and to the right of the viewfinder's negative lens 62 (see FIG. 1).

The apertures 74 and 76 are visible through the eye relief aperture 70 via the lower positive portion 68 of the bifocal element 64—the lower portion 68 being structured to focus on them. In this manner, when the trim element is moved to any position other than its nominal position (e.g., as shown in phantom in FIG. 3), its opaque portion 54 unblocks the apertures 74 and 76 and scene light entering the aperture 72 can be seen as a lighted rectangle as shown in FIG. 4 at 80.

A clear plastic cover 73 is provided over the aperture 72 to prevent foreign matter from entering the interior of the camera 10.

In the foregoing manner means responsive to the camera's trim means are provided for providing a user of the camera 10 with a visual indication in the camera's viewfinder that the trim means is positioned at one of its positions other than its nominal position so that the user of the camera, while framing the subject matter to be photographed, can at his discretion adjust the camera's exposure trim means for an exposure that will produce a a picture which will be either lighter or darker than the one that would be produced if the trim means remained unchanged or place the trim means in its nominal position. A primary advantage of the foregoing structure is that no visual distraction appears in the camera's viewfinder when the trim element 52 is in its nominal position.

Certain changes may be made in the above described embodiment without departing from the scope of the invention. For example, one alternative to the preferred embodiment could be a phosphorescent sign mechanically linked in a simple manner with the trim element 52 so that it became visible within the camera's viewfinder, but outside its field of view, whenever the trim element 52 was moved to one of its positions other than its nominal one. In this case, the lower positive lens portion 68 of the bifocal element 64 can be made to focus at a point in the camera's viewfinder where the sign would appear.

Another alternative would be to provide a mechanical sign which at least partially obstructed the camera viewfinder's field of view whenever the trim element 52 was moved off its nominal position.

Those skilled in the art may make still other changes according to the teachings of the disclosure. Therefore, it is intended that all matter contained in the above description or shown in the accompanying drawings shall be interpreted as illustrative and not in a limiting sense.

What is claimed is:

1. Photographic camera apparatus for use in a camera of the automatic type which is adapted to use film having a given speed, said apparatus comprising:

a housing having at least a first and a second light-admitting aperture;

viewfinder means mounted in said housing and structured for observing through said first aperture a field-of-view generally coextensive with the camera's field-of-view with which said apparatus will be used so that a camera user can aim the camera to frame the subject matter to be included in a picture and including means by which said housing's second aperture can be observed;

automatic exposure means for controlling the exposure of a film, said automatic exposure means including manually adjustable trim means for selectively varying the control of said automatic exposure means, said trim means being movable between a nominal position at which the exposure delivered to the film is a predetermined value and other positions at which the exposure delivered to the film differs from said predetermined value by predetermined amounts, greater or less than said predetermined value, which depend on the position of said trim means, said trim means including means for blocking said second aperture when said trim means is located in its nominal position and for unblocking said second aperture when said trim means is in a position other than its nominal position to provide to a user of the camera a visual indication in said viewfinder means that said trim means is positioned at one of its positions other than its said nominal position so that the user of the camera, while framing the subject matter to be photographed, can at his discretion adjust said trim means for an exposure that will produce a picture which will be either lighter or darker than the one that would be produced if said trim means remained unchanged or can place said trim means in its said nominal position.

2. The apparatus of claim 1 wherein said viewfinder means includes a bifocal optical element part of which is structured to aid in observing said housing's second aperture and the other part of which is structured to facilitate observation of the camera's field-of-view.

3. The apparatus of claim 1 wherein said viewfinder means is structured to view the scene to be photographed independently of the camera's optical taking system.

4. The apparatus of claim 3 wherein said viewfinder means comprises a reversed Galilean telescope comprising a negative lens for receiving scene light through said first aperture and forming a virtual image of the scene and a positive eyelens spaced from said negative lens and structured to focus on said virtual image and an eye relief aperture spaced at a predetermined distance from said positive eyelens so that said virtual image can be observed via said positive eyelens and wherein said means for observing said second aperture comprises another positive eyelens positioned and structured to focus on said second aperture so that said second aperture can be observed through said eye relief aperture.

5. Photographic camera apparatus for use in a camera of the automatic type which is adapted to use film having a given speed, said apparatus comprising:

a housing having at least a first and a second light-admitting aperture;

viewfinder means mounted in said housing and structured for observing through said first aperture a field of view generally coextensive with the camera's field of view with which said apparatus will be used so that a camera user can aim the camera to frame the subject matter to be included in a picture and including means by which said housing's second aperture can be observed, said viewfinder means being structured to view the scene to be photographed independently of the camera's optical taking system and comprising a reversed Galilean telescope comprising a negative lens for receiving scene light through said first aperture and forming a virtual image of the scene and a positive eyelens spaced from said negative lens and structured to focus on said virtual image and an eye relief aperture spaced at a predetermined distance from said positive eyelens so that said virtual image can be observed via said positive eyelens and wherein said means for observing said second aperture comprises another positive eyelens positioned and structured to focus on said second aperture so that said second aperture can be observed through said eye relief aperture; and automatic exposure means for controlling the exposure of a film, said automatic exposure means including manually adjustable trim means for selectively varying the control of said automatic exposure means, said trim means being movable between a nominal position at which the exposure delivered to the film is a predetermined value and other positions at which the exposure delivered to the film differs from said predetermined value by predetermined amounts, greater or less than said predetermined value, which depend on the position of said trim means, said trim means including means for blocking said second aperture when said trim means is located in its nominal position and for unblocking said second aperture when said trim means is in a position other than its nominal position to provide to a user of the camera a visual indication in said viewfinder means that said trim means is positioned at one of its positions other than its said nominal position so that the user of the camera, while framing the subject matter to be photographed can at his discretion adjust said trim means for an exposure that will produce a picture which will be either lighter or darker than the one that would be produced if said trim means remained unchanged or can place said trim means in its said nominal position, said automatic exposure means including light responsive means having scene light sensing means for providing a control signal having a characteristic which varies in accordance with the intensity of scene light incident thereon and wherein said trim means includes a light-transmissive member of varying light transmissive characteristics mounted for movement in scene light intercepting relation with respect to said scene light sensing means to vary the amount of scene light reaching said light sensing means and thereby change the magnitude of said control signal in accordance with the position of said light transmissive member with respect to said scene light sensing means.

6. The apparatus of claim 5 wherein said positive lenses are formed as an integral bifocal optical element located in a predetermined plane between said negative lens and said eye relief aperture.

7. The apparatus of claim 2 or 5 wherein said light transmissive member is mounted for linear motion with respect to said scene light sensing means.

8. Photographic camera apparatus for use in a camera of the automatic type which is adapted to use film having a given speed, said apparatus comprising:

a housing having at least a first and a second light-admitting aperture;

viewfinder means mounted in said housing and structured for observing through said first aperture a field of view generally coextensive with the camera's field of view with which said apparatus will be used so that a camera user can aim the camera to frame the subject matter to be included in a picture and including means by which said housing's second aperture can be observed; and automatic exposure means for controlling the exposure of a film, said automatic exposure means including light responsive means having scene light sensing means for providing a control signal having a characteristic which varies in accordance with the intensity of scene light incident thereon and manually adjustable trim means for selectively varying the control of said automatic exposure means, said trim means being movable between a nominal position at which the exposure delivered to the film is a predetermined value and other positions at which the exposure delivered to the film differs from said predetermined value by predetermined amounts, greater or less than said predetermined value, which depend on the position of said trim means, said trim means including means for blocking said second aperture when said trim means is located in its nominal position and for unblocking said second aperture when said trim means is in a position other than its nominal position to provide to a user of the camera a visual indication in said viewfinder means that said trim means is positioned at one of its positions other than its said nominal position so that the user of the camera, while framing the subject matter to be photographed can at his discretion adjust said trim means for an exposure that will produce a picture which will be either lighter or darker than the one that would be produced if said trim means remained unchanged or can place said trim means in its said nominal position, said trim means including a light-transmissive member of varying light transmissive characteristics mounted for movement in scene light intercepting relation with respect to said scene light sensing means to vary the amount of scene light reaching said light sensing means and thereby change the magnitude of said control signal in accordance with the position of said light transmissive member with respect to said scene light sensing means.

* * * * *